(12) United States Patent
Vong

(10) Patent No.: US 7,577,917 B2
(45) Date of Patent: Aug. 18, 2009

(54) USER INTERFACE WITH LOOPING MENU

(75) Inventor: William Vong, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 284 days.

(21) Appl. No.: 11/506,427

(22) Filed: Aug. 18, 2006

(65) Prior Publication Data
US 2008/0066003 A1    Mar. 13, 2008

(51) Int. Cl.
G06F 3/048    (2006.01)
(52) U.S. Cl. ..................................... 715/767
(58) Field of Classification Search ................. 715/830
See application file for complete search history.

(56) References Cited
U.S. PATENT DOCUMENTS
6,734,883 B1 *    5/2004    Wynn et al. ................. 715/830

OTHER PUBLICATIONS
Microsoft Press, "Microsoft Windows User Experience Official Guidelines for User Interface Developers and Designers," 1999.*

\* cited by examiner

Primary Examiner—Laurie Ries
Assistant Examiner—Daniel Um

(57) ABSTRACT

A looping menu is implemented through appropriate spacing and positioning of menu elements and by masking repeating menu elements. The starting position of the mask may be calculated with respect to the width of the initial set of menu elements presented before encountering repeating menu elements and the gap spacing between the menu elements. A larger gap spacing may be used between the first and last menu elements in order to indicate the start of the menu element list and to properly position the repeating menu elements within the mask area. The starting position for the mask, and thereby the ultimate width of the mask, may be dynamically calculated for any configuration of menu elements regardless of number and length of menu elements in a looping menu.

20 Claims, 9 Drawing Sheets

USER INTERFACE WITH LOOPING MENU

BACKGROUND

A user interface (UI) for media selection has been previously described to include a menu system configured in layers such that a media presentation (e.g., a movie) and the UI may be displayable concurrently. Therefore, a user of the UI is able to continue to view the media presentation (e.g., the movie) if presently playing, while interacting with the UI and without leaving the current presentation mode, e.g., presentation of the movie. The menu system presents alternate media selections or related information (hereinafter "media items") in the form of a gallery of graphic icons or objects. This gallery may be composed of many entries, e.g., movie titles, television show titles, actors, directors, song titles, album names, album cover art, artist names, etc., which may be displayed based upon the selection in the menu system. The UI is context sensitive to the media presentation, i.e., it offers control features that are relevant to the media presentation. The control features are provided as a looping set of menu elements.

Currently the menu elements wrap from the beginning of a list of the menu elements to the end. This allows for simple navigation through a long list of menu elements. In this particular implementation, list wrapping repeats the entire list of menu elements at the end of the list. However, if the list of menu elements is short, the duplicate instances of menu elements in the list appear across the UI to create a list long enough to wrap across the UI. Although a wrapping and scrolling function is achieved, the design is unsightly and confusing due to either the presence of duplicate menu elements, menu elements that break at different positions at opposite edges of the UI, or both.

SUMMARY

A clear and visually pleasing looping menu may be achieved through appropriate spacing and positioning of menu elements and by masking repeating menu elements. The starting position of the mask may be calculated with respect to the width of the initial set of menu elements presented before encountering repeating menu elements and the gap spacing between the menu elements. A larger gap spacing may be used between the first and last menu elements in the looping menu in order to indicate the start of the menu element list as well as to properly position the repeating menu elements within the mask area. The starting position for the mask, and thereby the ultimate width of the mask, may be dynamically calculated for any configuration of menu elements regardless of number and length of menu elements in a looping menu.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Other features, details, utilities, and advantages of the claimed subject matter will be apparent from the following more particular written Detailed Description of various embodiments and implementations as further illustrated in the accompanying drawings and defined in the appended claims.

DETAILED DESCRIPTION

In the following discussion, an exemplary media presentation environment is first described in which a user interface with a looping menu may be employed. Exemplary user interfaces are then described which may be employed in the exemplary environment, as well as in other environments.

Figure 1:
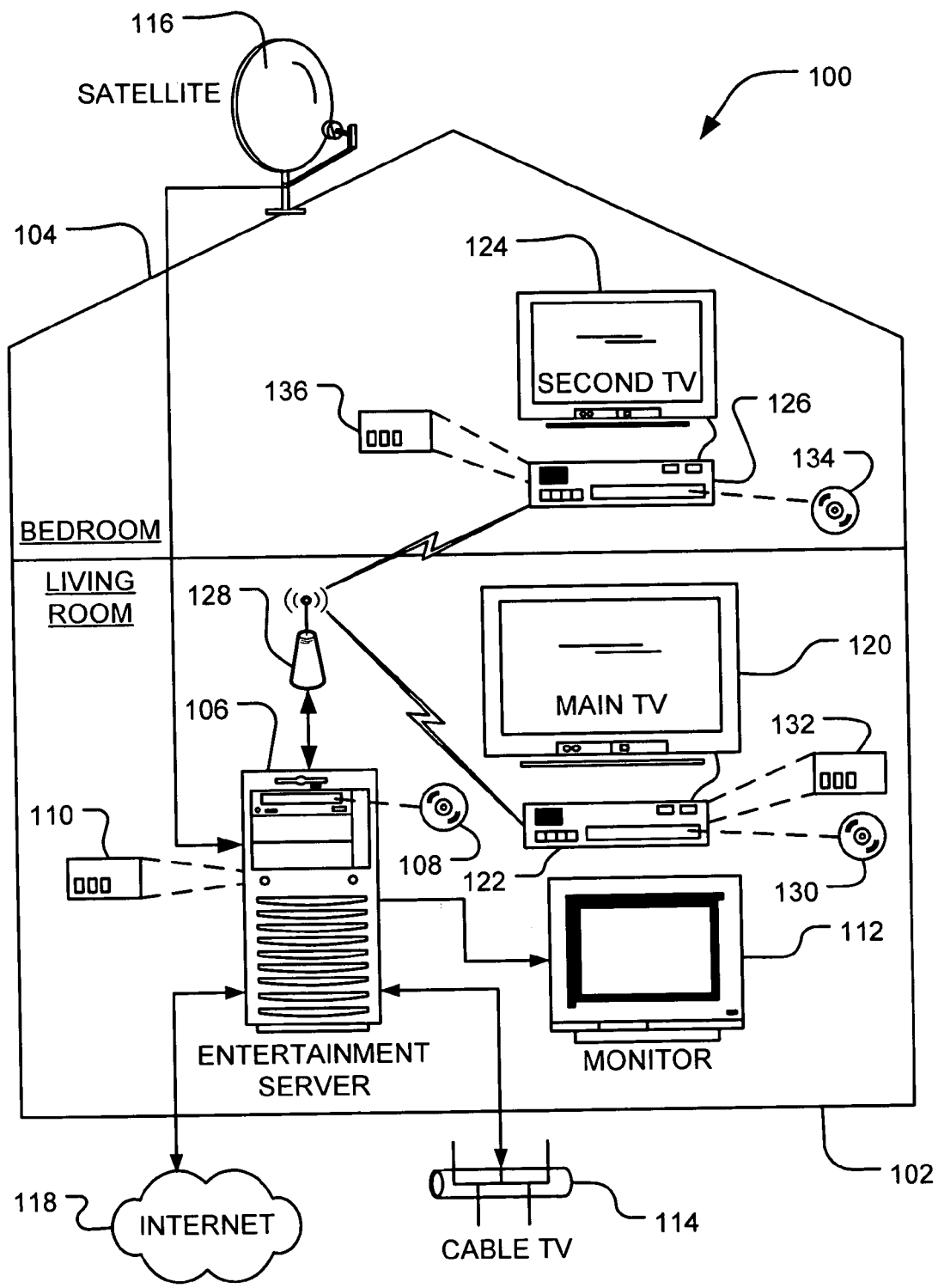
FIG. 1 is a schematic diagram of a home entertainment environment upon which a UI with a looping menu may be implemented.

FIG. 1 depicts an exemplary media network in a home entertainment environment 100 including a living room 102 and a bedroom 104, although the media network may be extended to any room or may be implemented in any building, facility or other environment. Central to the home entertainment environment 100 is a media server 106, in this implementation situated in the living room 102, but it could be located anywhere within the house. In one implementation, the media server 106 is a conventional personal computer (PC) configured to run a multimedia software package, for example, the WINDOWS® XP Media Center Edition operating system (Microsoft Corporation, Redmond Wash.). In such a configuration, the media server 106 is able to integrate full computing functionality with a complete home entertainment system into a single PC. For example, a user can watch television (TV) in one graphical window of a video monitor, while sending email or working on a spreadsheet in another graphical window on the same monitor. In addition, the media server 106 may also include other features or components, for example: a personal video recorder (PVR) to capture live TV shows for future viewing or to record the future broadcast of a single program or series; a compact disc (CD) or digital video disc (DVD) drive 108 for disc media playback; a memory drive 110 for integrated storage of and access to a user's recorded content, such as TV shows, songs, pictures, and home videos; and an electronic program guide (EPG).

Instead of a conventional PC, the media server 106 may comprise a variety of other devices capable of storing and distributing media content including, for example, a notebook or portable computer, a tablet PC, a workstation, a mainframe computer, a server, an Internet appliance, or combinations thereof. The media server 106 may also be a set-top box capable of delivering media content to a computer where it may be streamed, or the set-top box itself could stream the media content. As the media server 106 may be a full-function computer running an operating system, the user may also have the option to run standard computer programs (e.g., word processing and spreadsheet), send and receive emails, browse the World Wide Web, or perform other common functions.

In addition to storing media content, the media server 106 may be connected with a variety of media sources, for example, a cable connection 114, a satellite receiver 116, an antenna (not shown for the sake of graphic clarity), and/or a network such as the Internet 118. A user may thus control a live stream of media content (e.g., TV content) received, for example, via the cable connection 114, the satellite receiver 116, or antenna. This capability is enabled by one or more tuners residing in the media server 106. The one or more tuners may alternatively be located remote from the media server 106. In either case, the user may choose a tuner to fit any particular preferences. For example, a user wishing to watch both standard definition (SD) and high definition (HD) content may employ a tuner configured for both types of content. Alternately, the user may employ an SD tuner for SD content and an HD tuner for HD content separately.

The TV content may be received as an analog (i.e., radio frequency) signal or a digital signal (e.g., digital cable). The received TV content may include discrete content packets, where each content packet includes actual TV content (i.e., audio and video data) and a policy or policies associated with the actual TV content. If TV content is received as an analog signal, discrete content packets may be created from the analog signal. Digital rights management (DRM) policies may be employed to protect the actual TV content or video content digitally stored on the media server 106.

The home environment 100 may also include one or more network devices functioning as media receivers 122, 126 placed in communication with the media server 106 through a network 128, for example, a local area network (LAN). In an exemplary embodiment, the media receivers 122, 126 may be a Media Center Extender device, for example, an Xbox 360™ (Microsoft Corporation, Redmond, Wash.). The media receivers 122, 126 may also be implemented as any of a variety of conventional media rendering or computing devices, including, for example, a set-top box, a television, a video gaming console, a desktop PC, a notebook or portable computer, a workstation, a mainframe computer, an Internet appliance, a handheld PC, a cellular telephone or other wireless communications device, a personal digital assistant (PDA), or combinations thereof. Each of the media receivers 122, 126 may additionally have optical disc drives 130, 134, respectively, for compact disc (CD) or digital video disc (DVD) media playback. Each of the media receivers 122, 126 may also have memory drives 132, 136, respectively, to allow the media receivers 122, 126 to function as a DVR. Furthermore, the media receivers 122, 126 may include a tuner as described above.

The network 128 may comprise a wired and/or wireless network, for example, cable, Ethernet, WiFi, a wireless access point (WAP), or any other electronic coupling means, including the Internet. The network 128 may enable communication between the media server 106, the media receivers 122, 126, and any other connected device through packet-based communication protocols, such as transmission control protocol (TCP), Internet protocol (IP), real-time transport protocol (RTP), and real-time transport control protocol (RTCP). Communications may be transmitted directly between devices over a LAN, or they may be carried over a wide area network (WAN), for example, the Internet 118.

One or more video display devices, for example a main TV 120 in the living room 102, a secondary TV 124 in the bedroom 104, and a video monitor 112 may be situated throughout the home environment 100. These video display devices may be connected with the media server 106 via the network 128 either directly or via the media receivers 122, 126. As shown in the example of FIG. 1, the main TV 120 and the secondary TV may be coupled to the media receivers 122, 126 through conventional cables. The video monitor 112 may be coupled with the media server 106 directly via a video cable. The media server 106 and media receivers 122, 126 may also or alternatively be coupled with any of a variety of video and audio presentation devices. Media content including TV content may thus be supplied to each of the video display devices 112, 120, 124 over the home network 128 from the media server 106 situated in the living room 104.

The media receivers 122, 126 may be configured to receive streamed media content, including video and TV content, from the media server 106. Media content, and particularly video and TV content, may be transmitted from the media server 106 to the media receivers 122, 126 as streaming media comprised of discrete content packets via any of the network protocols described above. The streamed media content may comprise video IP, SD, and HD content, including video, audio, and image files, decoded on the home network devices 122, 126 for presentation on the connected TVs 120, 124. The media content may further be "mixed" with additional content, for example, an EPG, presentation content related to the media content, a web browser window, and other user interface environments transmitted from the media server for output on the TVs 120, 124 or the monitor 112. Such additional media content may be delivered in a variety of ways using different protocols, including, for example, standard remote desktop protocol (RDP), graphics device interface (GDI), or hypertext markup language (HTML).

In addition to the media receivers 122, 126 and the video display devices 112, 120, 124, the media server 106 may be connected with other peripheral devices, including components such as digital video recorders (DVR), cable or satellite set-top boxes, speakers, and a printer (not shown for the sake of graphic clarity). The media server 106 may also enable multi-channel output for speakers. This may be accomplished through the use of digital interconnect outputs, such as Sony-Philips Digital Interface Format (S/PDIF) or TOSLINK® enabling the delivery of Dolby Digital, Digital Theater Sound (DTS), or Pulse Code Modulation (PCM) surround decoding.

Figure 2:
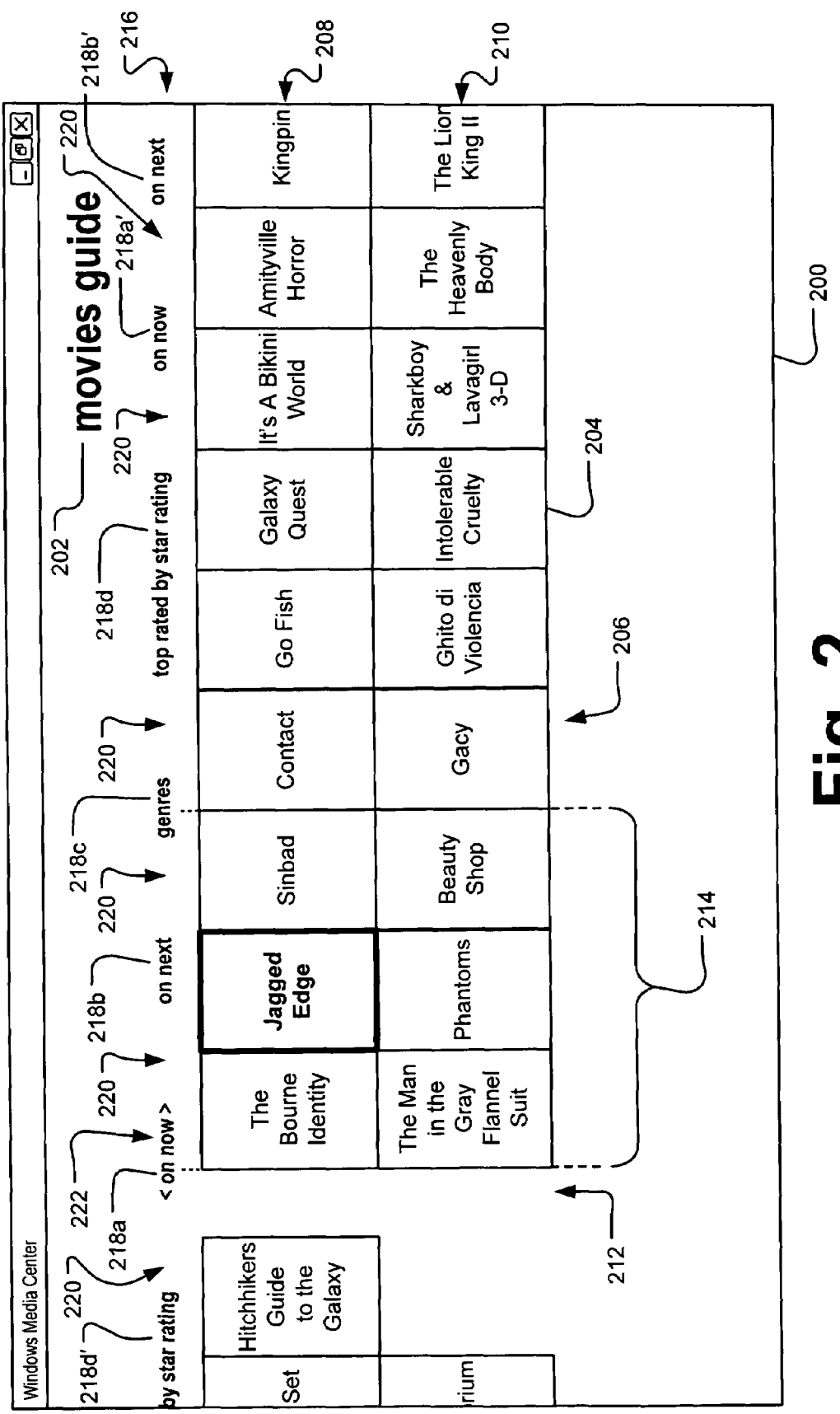
FIG. 2 is a schematic diagram of an implementation of a UI with a looping menu without a mask.

FIG. 2 depicts an exemplary implementation of a UI 200 for selecting and controlling media items 204 and media devices in a home entertainment network. In the example of FIG. 2, the UI 200 is representative of a UI for a movie guide 202 implemented by the WINDOWS® XP Media Center Edition operating system. The movie guide 202 is presented in the UI 200 as a looping gallery 206 of media items 204, in this example movies. For clarity in the representation of FIG. 2, the media items 204 are only shown as movie titles. However, in practice the media items 204 may be representations of CD or album art, DVD box art, icons, thumbnail photographs, or any other graphic identification of particular media available for presentation.

If the presentation context relies on full-screen presentation of media (e.g., television programming or video), i.e., where the video itself consumes all of the available display area of a display device, the looping gallery 206 or other UI functionality may be displayed in a reduced size or in a less disruptive location, e.g., toward the bottom of the display area. The UI 200 may also be displayed "on top" of the media presentation as an overlay while still conserving available display area of the display device. In the context of a music-related without a corresponding full-screen video experience, the looping gallery 206 and other components of the UI 200 may be rendered on a greater area of the display area.

The looping gallery 206 may be presented as a first carousel 208 and a second carousel 210 of media items 206 arranged horizontally across the UI 200. Although two carousels are depicted in FIG. 2, other implementations may have more carousels or be limited to a single carousel. The looping gallery 206 may alternately be presented in a vertical orientation or other orientation amenable to ease of presentation to and navigation by a user.

The media items 204 in the looping gallery 206 may be greater in number than can fit within the display area of the UI 200, which may fill the entire width or display area of the presentation device. By navigating using an input device, e.g., a joystick or left/right/up/down arrows on a keyboard or remote control, the user may scroll through the looping gallery 206 of media items 204 to rotate media items 204 out of view into the UI 200 while moving media items 204 previously in view out of the UI window or otherwise off the screen. Alternately, if there are only a few media items 204, then they may all be displayed within the UI 200 at all times, although still looping during navigation in order to move media items into a navigation lock region 214 as further described below.

A carousel break 212 implemented as an empty space identifies the boundary between first and last media items 204 in the first and second carousels 208, 210 of the looping gallery 206. Thus, the looping gallery 206 provides easy access to a large number of media items 204 by a user. The user may also use the input device to transition between the first carousel 208 and the second carousel 210 to select any particular media item 206 for presentation, further information, or other purpose.

Although not shown in FIG. 2, the media UI may provide vertical grouping of media items in a horizontally oriented looping gallery. For example, music albums or songs by the same artist may be grouped vertically by artist, thereby providing global navigation between artists horizontally such that a user may move through the entire body of artists using left/right navigation. As, the albums or songs by each respective artist are grouped vertically, the user may navigate up and down to select individual media items in the vertical list. Alternately, a looping gallery of music albums could be presented horizontally with a listing of songs on each album presented vertically. The same effect may be implemented with respect to movies, for example, by grouping media items vertically according to actor or director. Thus, the user is provided with the ability to move by column (e.g., group), allowing the user to "skip" between collections of media items as opposed to having to move individually through each media item one at a time.

In FIG. 2, the six media items 204 (i.e., movie titles "The Bourne Identity," "Jagged Edge," "Sinbad," The Man in the Gray Flannel Suit," "Phantoms," and "Beauty Shop") to the right of the carousel break 212 are positioned in a navigation lock region 214 (indicated by the vertical dashed lines), which in this example comprises a 3×3 grid of media items 204. However, the navigation lock region 214 may be larger or smaller as desired. The navigation lock region 214 provides an area of the looping gallery 206, in which, the user may select a particular media item 206. While in the navigation lock region 214, navigation commands, i.e., left/right/up/down, allow the user to "focus" on a particular media item 204 for selection. In the example of FIG. 2, the film "Jagged Edge" is in focus as indicated by the bold appearance of the title and the border and is available for selection, e.g., by pressing an "enter" command on an input device. In other implementations, focus on a particular media item may be indicated in a variety of ways, for example, enlarging the media item 204; and coloring, brightening, or otherwise highlighting the media item 204, or displaying meta data or additional information about the media item 204 proximally or connected to the media item 204 in focus.

If the user attempts to navigate upward, control leaves the looping gallery 206 and transfers to a looping or pivot menu 216 to be described in greater detail below. If the user attempts to navigate downward, the focus would shift to the media item "Phantoms." If a second downward navigation command were received, the effect may be one of several possibilities, e.g., no action, a transfer to another component of the UI 200 (not shown in the example of FIG. 2), or a loop to transfer control to the pivot menu 216 above the looping gallery 206. If the user navigates rightward from "Jagged Edge," focus would shift to the media item "Sinbad."

If the user navigates rightward again, the user effectively exits the navigation lock area and a scrolling function is activated to move the media items 204 originally to the right of the navigation lock region 214 successively into the navigation lock region 214, allowing the user an opportunity to focus on any media item 204 in the looping gallery 206. Similarly, if the user were to navigate leftward from the media item "Jagged Edge" with two commands, the scrolling function is activated to media items 204 originally to the left of the navigation lock region 214 successively into the navigation lock region 214, allowing the user an opportunity to focus on other media items 204 in the looping gallery 206. Stated another way, media items 204 that are not in the navigation lock region 214 are not selectable by the user until the user scrolls or rotates the media items 204 into the navigation lock region 214. Note also that the user may continuously scroll through the entire looping gallery 206 in either horizontal direction. Further note that while navigating among the media items 204 in the navigation lock region 214, the looping gallery 206 is stationary, i.e., it does not scroll.

It may also be noted that the carousel break 212 between the beginning and end of the media items 204 in the looping gallery 206 moves across the display as the looping gallery 206 is scrolled. In one implementation, navigation through the carousel break 212 may be managed differently than navigation through the media items 204 themselves. For example, when the carousel break 212 moves into the navigation lock region 214, focus navigation control may be suspended until the carousel break 212 moves past or out of the navigation lock region 214. Stated another way, the looping gallery 206 continues to scroll while the carousel break 212 is within the navigation lock region 214 regardless of a left or right navigation input that would otherwise suspend scrolling and allow the user to focus on a media item. Thus, the carousel break 212 will never be stationary within navigation lock region 214 and will only be static at a position to the right or left (or outside the display range of the UI 200) of the navigation lock region 214. Such an implementation allows the "size" (i.e., an amount of display area of the UI 200 consumed by the navigation lock region 214 to be constant instead of requiring recalculation of display positions for media items 204 represented.

As noted above, if the user were to navigate upward from the "Jagged Edge" media item in focus in FIG. 2, control would be transferred to a looping or pivot menu 216. As depicted in FIG. 2, the pivot menu 216 may be composed of one or more menu elements 218a, 218b, 218c, 218d. The term "pivot" is used in reference to the looping nature of the menu 216 as a user can move or "turn" back and forth in either direction to navigate through the menu elements 218a, 218b, 218c, 218d. Each of the menu elements 218a, 218b, 218c, 218d may be separated from adjacent menu elements by a respective gap 220. In the example of FIG. 2 the menu elements 218a, 218b, 218c, 218d are textual identifiers of the selection or arrangement of media items 204 in the looping gallery 206. Alternately, the menu elements may be icons or other graphic representations, thumbnail pictures, or any other menu function identifier.

In general, in order to accommodate long lists of menu elements in the pivot menu 216, the menu elements are designed to wrap around from the beginning of the list to the end. This behavior may be achieved for short lists of menu elements by creating multiple instances of the same menu elements to extend across the UI 200. Such an instance is depicted in FIG. 2 wherein there are four menu elements 218a, 218b, 218c, 218d that do not extend across the entire UI 200 width. Thus repeating menu elements 218a', 218b', 218d' (and in other configurations when navigating through the menu elements, another instance of the menu element 218c "genre" as well) are inserted in the pivot menu 216 in order to work within the expectations of the general algorithm and to achieve the wrapping effect.

The selected menu element, menu element 218a in the example of FIG. 2, is positioned in a focus area 222 within the UI window 200. The focus area 222 may coincide with or be generally adjacent to the navigation lock region 214, but it need not be. When the user navigates between menu elements 218a, 218b, 218c, 218d by input of a left or right command, the menu elements 218a, 218b, 218c, 218d are relocated and cycle through the focus region 222. In this manner a scrolling effect in the pivot menu 216 is achieved.

As the user navigates through the available menu elements 218a, 218b, 218c, 218d in the pivot menu 216, the media items 204 in the looping gallery 206 may be automatically updated. For example, the selected menu element 218a labeled "on now" may populate the looping gallery with media items 204 (in this case movies as the UI 200 is in a movie guide 202 configuration) that are currently playing on available television stations. Comparatively, if the menu element 218b labeled "on next" were selected, the looping gallery 206 may be populated with a different set of media items 204 representing movies that will be playing on television at the conclusion of any of the presently playing movies (see e.g., FIG. 4). In an alternate example, a media UI for images, e.g., digital photographs, may be provided with a looping or pivoting menu that provides functionality to arrange the images by date, source, event, or other determined category.

This command functionality is thus quite different from traditional menu navigation techniques that require a user to open a new UI window or browse through "drop down" menus to find a particular media item of interest, information about that media item, features related to the media item, or commands and controls to effect the viewing and playback of the media. Further, traditional techniques often open additional windows directing the user to make the changes and select "OK" outside of the current experience through the use of a dialog box, significantly obscuring the media being presently presented. In this implementation, the selection of menu elements 218a, 218b, 218c, 218d happens automatically by merely moving "right" and "left" through the pivot menu 216. Further, the pivot menu 216 may be presented as an overlay over a media presentation, thus allowing a user to make a functional selection without having to leave the presentation experience.

In one implementation of the pivot menu 216, if the menu elements 218a, 218b, 218c, 218d do not completely extend the width of the UI window 200 or the screen, copies of the menu elements 218a', 218b', 218d' may be generated in order to create the scrolling or looping effect across the entire UI window 200. However, the repeated menu elements 218a', 218b', 218d' may be confusing and unsightly to the user. Another drawback that is also a visual consequence of the generation of repeating menu elements 218a', 218b', 218d' is that a repeating menu element 218a', 218b', 218d' may appear partially at both ends of the pivot menu 206 with overlap of displayed portions rather than an appearance of wrapping between each end of the UI window 200. This additional unsightly visual effect is a result of a combination of the length of the menu elements 218a, 218b, 218c, 218d individually, the width of the gaps 220, and the width of the UI screen 200.

Figure 3:
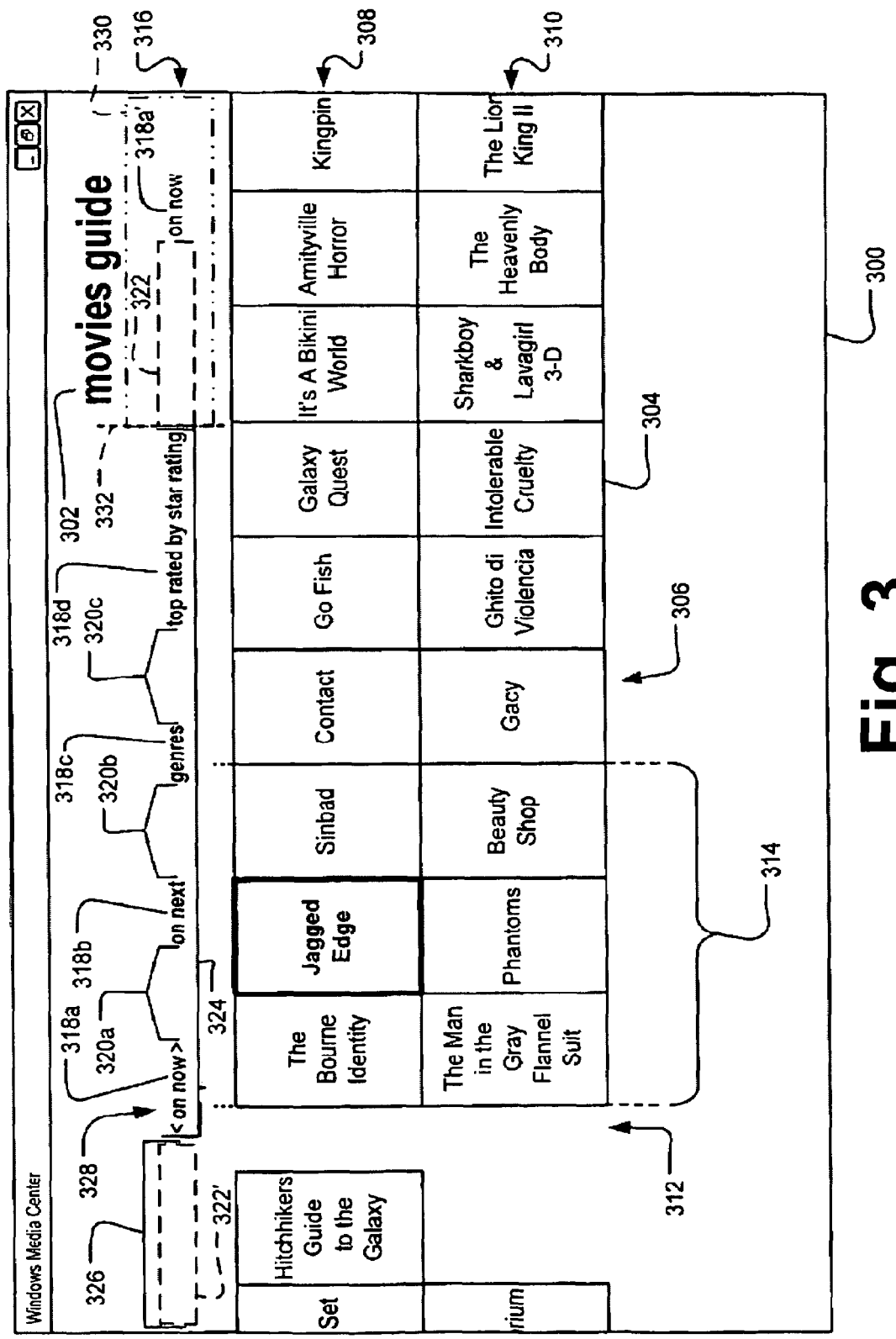
FIG. 3 is a schematic diagram of an implementation of a UI with a looping menu further implementing a mask over repeating menu elements.
Figure 4:
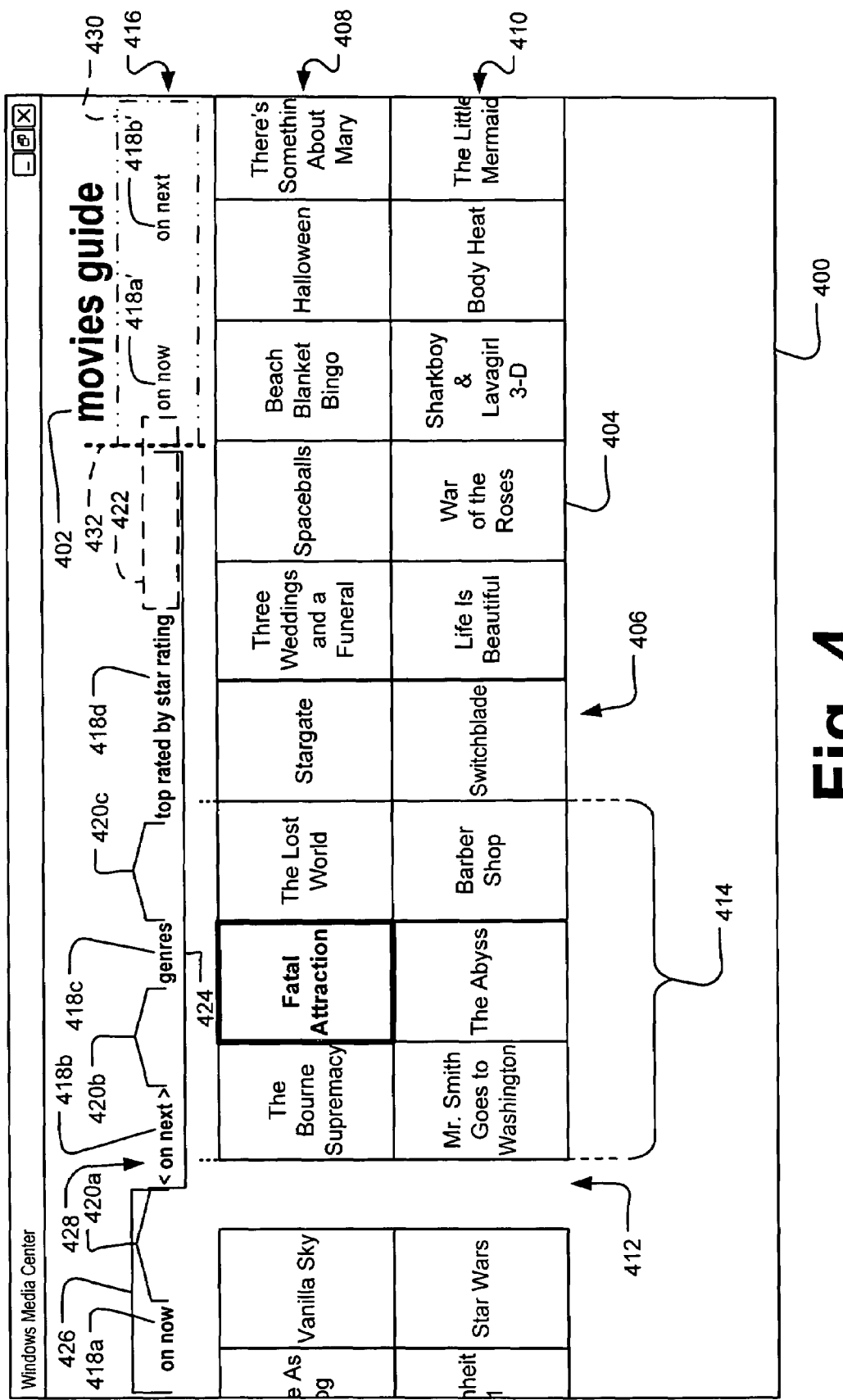
FIG. 4 is a schematic diagram of an implementation of a UI with a looping menu and mask with an alternate menu element in a focus position.
Figure 5:
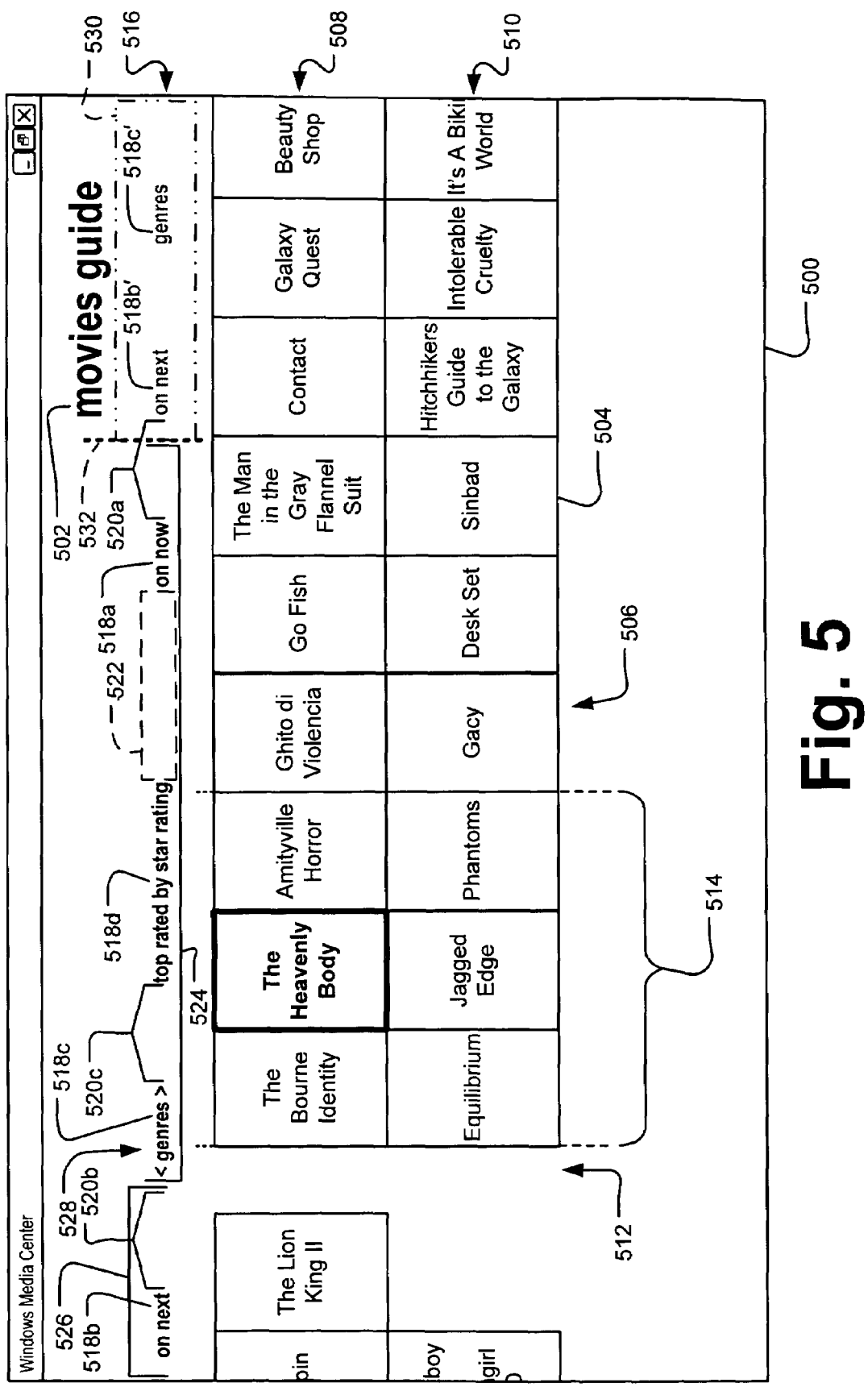
FIG. 5 is a schematic diagram of an implementation of a UI with a looping menu and mask with a further menu element in a focus position.

Another implementation of a UI with a looping or pivoting menu is presented in various forms in FIGS. 3-5. In this implementation, the menu elements and repeating menu elements are spaced and positioned to facilitate the creation of a mask to hide the repeating menu elements and avoid the overlap of displayed portions of a repeated menu element at each edge of the UI window or screen. Exemplary methodologies for creating a mask are described in further detail below.

As shown in FIG. 3, the UI 300 is very similar to the UI 200 presented in FIG. 2. The UI 300 is presented as a movies guide 302 composed of a collection of media items 304 arranged in a looping gallery 306 of a first carousel 308 and a second carousel 310. The beginning and end of the media items 304 listed in the carousels 308, 310 are separated by a carousel break 312 as a visual indication to the user. A navigation lock region 314 encompasses six media items and the media item entitled "Jagged Edge" is depicted as in "focus."

A pivot menu 316 is positioned above the looping gallery 306. The pivot menu 316 is composed of a series of menu elements 318a, 318b, 318c, 318d. Each of the menu elements 318a, 318b, 318c, 318d is separated from an adjacent menu element by a gap 320a, 320b, 320c of uniform width. A total menu width 324 is defined as the combined length of the initial presentation of menu elements 318a, 318b, 318c, 318d and intermediate gaps 320a, 320b, 320c. Note however, in this implementation the final menu element 318d is separated from the first repeating menu element 318a' toward the right side of the UI 300 by a double gap 322 of twice the width of the individual gaps 320a, 320b, 320c. The gaps 320a, 320b, 320c need not be uniform in size, but uniformity in size makes a mask calculation as described below a simpler problem to solve. Similarly, the double gap 322 need not be twice the width of the individual gaps 320a, 320b, 320c, but it should be greater than the width of the individual gaps 320a, 320b, 320c in order to achieve an appropriately sized mask 330 for the pivot menu 316.

Figure 6:
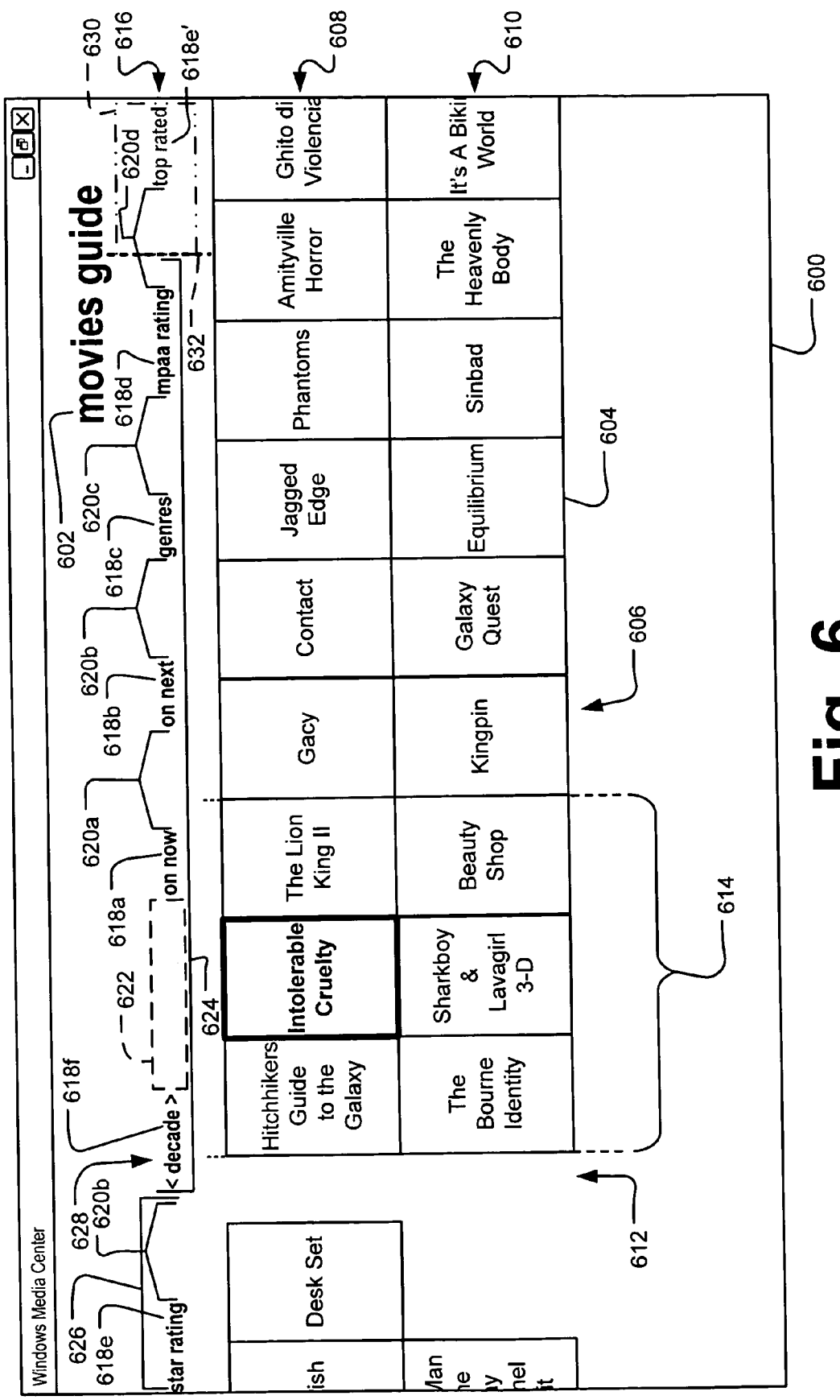
FIG. 6 is a schematic diagram of a further implementation of a UI with a longer looping menu implementing a mask over repeating menu elements.

As depicted in FIG. 3, a second double gap 322' similarly precedes the first menu element 318a toward the left edge of the UI 300. As described previously with respect to FIG. 2, in order to create the pivot menu 316, the menu elements are repeated across the width of the UI 300. Thus, an instance of the last menu element 318d will always be adjacent and to the left of an instance of the first menu element 318a. Further, there will always be a double gap 322 between the last menu element 318d and the first menu element 318a. It should be noted that in the implementation of FIGS. 3-5 and arbitrary number of four menu elements was selected for description. However, there may be greater or fewer menu elements depending upon the desired functionality of the particular UI. FIG. 6 described below herein provides an example of a UI with a greater number of menu elements.

In FIG. 3, the first menu element 318a is positioned in the focus area 328 as selected and the media items 304 in the looping gallery 306 are selected and arranged to correspond to the menu element in focus. In this example, the first menu element 318a depicted as "on now" provides a listing of movies presently playing on available television channels. The focus area 328 is positioned based upon the width of the edge space 326 allocated between the left edge of the UI window 300 and the left edge of the focus area 328. The width of the edge space 326 may be arbitrarily chosen to be any measure. In one implementation, the width of the edge space 326 may be chosen based upon aesthetic design considerations for the placement of the focus area 328 of the pivot menu 316.

Due to the relative similarity in the widths of the edge space 326 and the double gaps 322, 322', the last menu element 318d does not appear on the left side of the pivot menu 316 within the UI window 300. This results because the second double gap 322' effectively pushes the potential instance of the last menu element off the screen as compared to FIG. 2 wherein the gap 220 was smaller and the last menu element 218d' was partially shown as repeating on the left side of the UI 200. In addition, the double gap 322, and in the case of a short list of menu elements the second double gap 322', visually indicates to the user where the beginning and end of the pivot menu 316 is.

In fact, it has been found that by determining the size of the gaps 320a, 320b, 320c as a function of the edge space 326, in particular by stipulating that the gaps 320a, 320b, 320c each be at least one-half the width of the edge space 326 or greater, and further that the double gap 322 be twice the width of an individual gap 320a, 320b, 320c, repeating menu elements may be prevented from appearing on the left side of the UI 300. Further, by using these same measurement constructs, a starting position 332 for the left edge of a mask 330 may be calculated to hide any repeating menu elements at the right side of the pivot menu 316 that will be effective when any of the menu elements 318a, 318b, 318c, 318d is in the focus area 328.

In one implementation applicable to FIG. 3, the starting position 332 for the mask 330 may be calculated by summing the combined widths of the menu elements 318a, 318b, 318c, 318d, the intermediate gaps 320a, 320b, 320c, and the edge space 326. Another method for calculating the starting position 332 for the mask 330 may be to sum the combined widths of the menu elements 318a, 318b, 318c, 318d, the intermediate gaps 320a, 320b, 320c, and the double gap 322. A representation of this second method corresponding to the schematic of FIG. 3 from the left edge of the UI 300 may be considered as follows:

[GAP] [GAP] Element 1 [GAP] Element 2 [GAP] Element 3 [GAP] Element 4.

While the exemplary implementations for presenting a looping or pivoting menu and calculating a starting position for a mask are described in the context of a horizontally oriented menu, the masking concepts described herein may be extrapolated for use with a vertically-oriented looping menu, or a looping menu of any other orientation. Further, the mask may be positioned on either end of the pivot menu, or both, as desired. For example, if the language of the user is read right to left, e.g., Hebrew, then the mask may be positioned extending toward the left edge of the UI.

One exemplary method for calculating the widths of the menu elements 318a, 318b, 318c, 318d may be to determine an average width of the components of the menu elements 318a, 318b, 318c, 318d (in this case, the average width of the letters in words and spaces between words), count the number of components (i.e., the letters and spaces), and multiply the number of components by the average width. Further, the width attributable to the gaps 320a, 320b, 320c may be calculated by multiplying the gap width by one less than the number of menu elements and adding twice the gap width to account for the double gap 322. An exemplary equation for calculating the distance of the starting position 332 of the left edge of the mask 330 from the left edge of the UI 300 may thus be written as follows:

{(Average Component Width)×(Number of Components in Menu Elements)+(2×Gap Width)+ [(Number of Menu Elements−1)×(Gap Width)]}.

It may be appreciated that by making the gap width at least half the width of the edge space 326 between the left edge of the UI 300 and the left edge of the focus area 328, there will never be more than one menu element (or portion of a menu element if lengthy) to the left of the menu element in the focus area 328. Further, by having a double gap 322 between the last menu element and the first menu element, when the first menu element is in the focus area 328, no other menu element or even a portion of the last menu element will appear to the left of the focus area 328 because the double gap 322 will be at least as wide as the edge space 326. This guarantees that there will not be an unsightly duplicate remnant of a menu element when a new loping menu 316 is instantiated.

Additionally, while the calculation is dynamic in that it accurately renders a starting point 332 for a mask 330 for any configuration of menu elements in a pivot menu 316, the calculation for the starting position 332 for the mask 330 and thus the width of the mask 330 may be constant for each particular pivot menu 316, regardless of the position of the menu elements within the pivot menu 316. As will be understood in the discussion of FIGS. 4-6 below, the mask 330 will hide any repeating menu elements regardless of the particular menu element in the focus area 328. Note also that in an implementation with a long list of menu elements that would extend beyond the width of the UI 300, this equation will result in a starting position 332 for the mask 330 that is beyond the right edge of the UI 300 and thus a mask 330 would not be instantiated in the UI 300.

It may further be appreciated that in other implementations, the menu elements may be composed of other components than Latin letters and Arabic numerals, for example, graphics, icons, Asian or other language characters, thumbnail pictures, or other desired components. Also note in the case of text, the average component width may be variable based upon font attributes, e.g., point size, kerning, word spacing, scaling, and others. An additional consideration may be to factor the usage frequency of particular characters to weight the average component width. For example, in the case of letters, "m," a wide letter, is used much more frequently than "x" and "e" is used more frequently than "i," a narrower letter Further, the width of the menu elements may alternatively be exactly computed by summing the actual width of each component and space within the menu elements.

The mask 330 may be conceived as, a reverse bluescreen technique in which the repeated menu elements 318a', 318b' (and others as the user navigates and different menu elements rotate into the focus area 328) to the right of the starting position 332 are "removed" from the composite display of the UI 300 rather than added over a background. An alternative conception is to consider the menu elements and repeating menu elements as positioned within a layer and the mask 330 as covering or obscuring the repeated menu elements to the right of the starting position 332. Thus when all of the layers of the UI 300 are combined, the repeated menu elements under the mask are not visible as part of the UI 300.

FIG. 4 depicts the implementation of a UI 400 similar to the UI 300 of FIG. 3, but in a different state. As shown in FIG. 4, the UI 400 is presented as a movies guide 402 composed of a collection of media items 404 arranged in a looping gallery 406 of a first carousel 408 and a second carousel 410. The beginning and end of the media items 404 listed in the carousels 408, 410 are separated by a carousel break 412 as a visual indication to the user. A navigation lock region 414 encompasses six media items and the media item entitled "Fatal Attraction" is depicted as in "focus."

A pivot menu 416 is positioned above the looping gallery 406. The pivot menu 416 is composed of a series of menu elements 418a, 418b, 418c, 418d. Each of the menu elements 418a, 418b, 418c, 418d is separated from an adjacent menu element by a gap 420a, 420b, 420c of uniform width. Note however, that the last menu element 418d is separated from the first repeating menu element 418a' toward the right side of the UI 400 by a double gap 422. The total menu width 424 remains the sum of the lengths of the initial presentation of menu elements 418a, 418b, 418c, 418d, the intermediate gaps 420a, 420b, 420c, and the double gap 422. As depicted in FIG. 4 the starting position 432 of the mask 400 remains unchanged as indicated by the combined length of the edge space 426 (which is the same as the width of the double gap 422 in this implementation) and the total calculated menu width 424 extending from the left edge of the focus area 428.

In FIG. 4 the user has navigated one step to the right in the pivot menu 416 to scroll the pivot menu 416 to the left, thus placing the second menu element 418b entitled "on next" in the focus area 428. As a result, the media items 404 in the looping gallery 406 have all been revised to reflect movies on television to be broadcast at a time later than the present. Note that in the pivot menu 416, the first menu element 418a entitled "on now" has shifted to the left of the focus area 428. The last menu element 418d has also shifted left and is spaced apart from the starting position 432 of the mask 430. Note that the double gap 422 following the last menu element 418d extends beyond the starting position 432, thus ensuring that the repeating menu elements 418a', 418b' are within the area covered by the mask 430.

FIG. 5 depicts the implementation of a UI 500 similar to the UI 300 of FIG. 3 and the UI 400 of FIG. 4, but in a different state. As shown in FIG. 5, the UI 500 is presented as a movies guide 502 composed of a collection of media items 504 arranged in a looping gallery 506 of a first carousel 508 and a second carousel 510. The beginning and end of the media items 504 listed in the carousels 508, 510 are separated by a carousel break 512 as a visual indication to the user. A navigation lock region 514 encompasses six media items and the media item entitled "The Heavenly Body" is depicted as in "focus."

A pivot menu 516 is positioned above the looping gallery 506. The pivot menu 516 is composed of a series of menu elements 518a, 518b, 518c, 518d. Each of the menu elements 518a, 518b, 518c, 518d is separated from an adjacent menu element by a gap 520a, 520b, 520c of uniform width. Note however, that the last menu element 518d is separated from the first menu element 418a by a double gap 522. The total menu width 524 remains the sum of the lengths of the initial presentation of menu elements 518a, 518b, 518c, 518d, the intermediate gaps 520a, 520b, 520c, and the double gap 522. As depicted in FIG. 5 the starting position 532 of the mask 500 remains unchanged as indicated by the combined length of the edge space 526 (which is the same as the width of the double gap 522 in this implementation) and the total calculated menu width 524 extending from the left edge of the focus area 528.

In FIG. 5 the user has navigated one further step to the right in the pivot menu 516 from the state in FIG. 4 to scroll the pivot menu 516 to the left, thus placing the third menu element 518c entitled "genres" in the focus area 528. As a result, the media items 504 in the looping gallery 506 have all been revised to reorganize the movies presently playing on television in order by primary genre. Note that in the pivot menu 516, the second menu element 518b entitled "on next" has shifted to the left of the focus area 528 and the first menu element 518a entitled "on now" has looped and appears at the right side of the last menu element 518d before the starting position 532 of the mask 530. The last menu element 518d has also shifted left and is spaced apart from the first menu element 518a by a double gap 522. Note that the gap 520a following the first menu element 518a extends beyond the starting position 532, thus ensuring that the repeating menu elements 518b', 518c' are within the area covered by the mask 530.

FIG. 6 depicts an alternative implementation of a UI 600 to the UI implementations of FIGS. 3-5, primarily in the form of a longer list of menu elements 618a, 618b, 618c, 618d, 618e, 618f. As shown in FIG. 6, the UI 600 is presented as a movies guide 602 composed of a collection of media items 604 arranged in a looping gallery 606 of a first carousel 608 and a second carousel 610. The beginning and end of the media items 604 listed in the carousels 608, 610 are separated by a carousel break 612 as a visual indication to the user. A navigation lock region 614 encompasses six media items and the media item entitled "Intolerable Cruelty" is depicted as in "focus."

A pivot menu 616 is positioned above the looping gallery 606. The pivot menu 616 is composed of a series of menu elements 618a, 618b, 618c, 618d, 618e, 618f. Each of the menu elements 618a, 618b, 618c, 618d, 618e, 618f is separated from an adjacent menu element by a gap 620a, 620b, 620c, 620d of uniform width. Note however, that the last menu element 618f is separated from the first menu element 618a by a double gap 622. The total menu width 624 is the sum of the lengths of the initial presentation of menu elements 618a, 618b, 618c, 618d, 618e, 618f, the intermediate gaps 620a, 620b, 620c, 620d, and the double gap 622. As depicted in FIG. 6 the starting position 632 of the mask 600 is indicated by the combined length of the edge space 626 (which is the same as the width of the double gap 622 in this implementation) and the total calculated menu width 624 extending from the left edge of the focus area 628.

In FIG. 6 the user has navigated one step to the left in the pivot menu 516 from the a starting state in which the first menu element 618a would have been in the focus area 628 to scroll the pivot menu 616 to the right, thus placing the last menu element 618f entitled "decades" in the focus area 628. As a result, the media items 604 in the looping gallery 606 have all been revised to reorganize the movies presently playing on television in order by the decade of their release. Note that in the pivot menu 616, the fifth menu element 618e entitled "top rated by star rating" has shifted to the left of the focus area 628. Because the length of the fifth menu element 618e is greater than the space between the left edge of the UI window 600, only a right-hand portion of the fifth menu element 618e is displayed.

Note also that a repeating instance of the fifth menu element 618e' appears at the right edge of the UI window 600, but because the length of the repeating fifth menu element 618e' is greater than the remaining space after the fourth gap 620d before the right edge of the UI window 600, only a left-hand portion of the fifth menu element 618e' is displayed. The gap 620d following the fourth menu element 518618d entitled "mpaa rating" extends beyond the starting position 632 of the mask 630, thus ensuring that the repeating menu element 618e' is within the area covered by the mask 630. Thus, in this implementation the mask 630 further prevents the unsightly presentation of the fifth menu element 618e and a repeating fifth menu element 618e' broken at different positions at opposite edges of the UI window 600.

Figure 7:
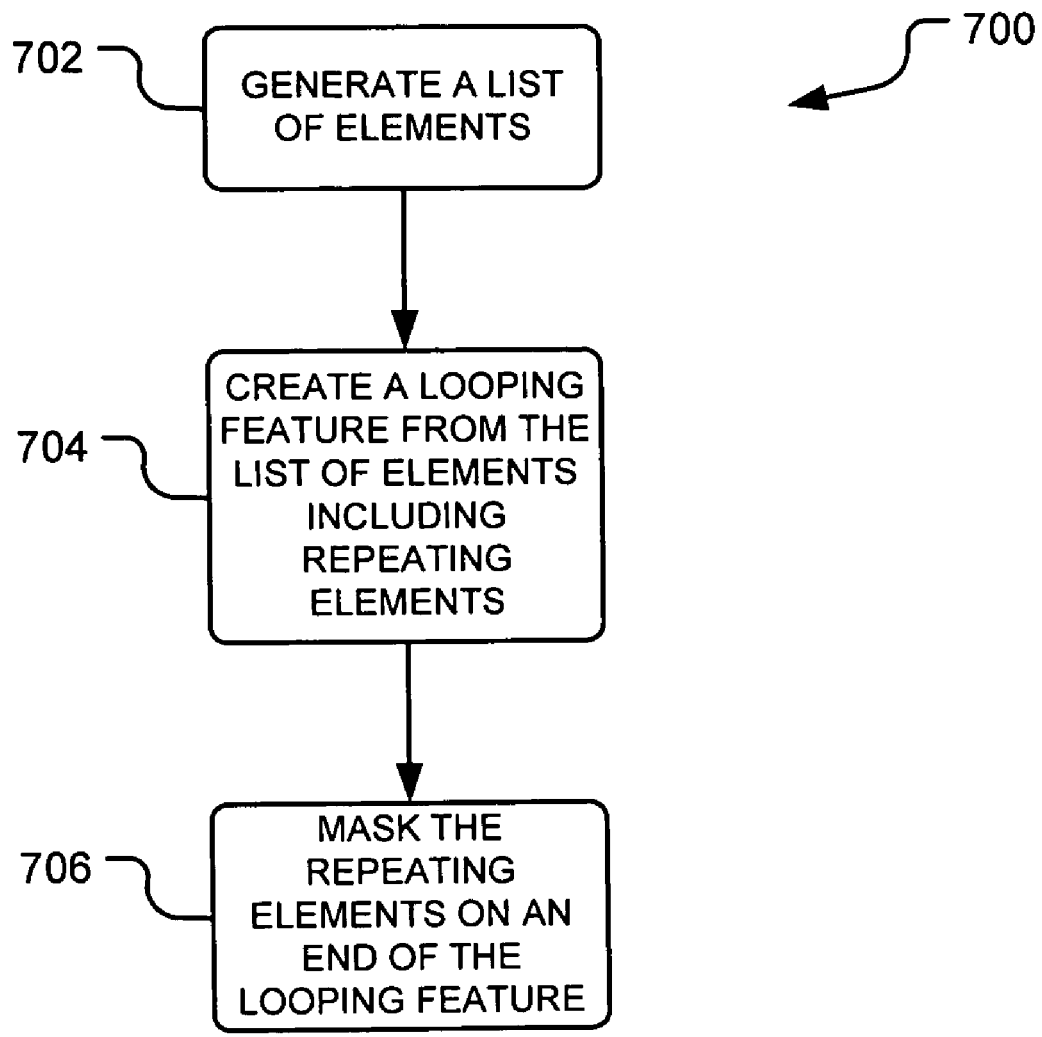
FIG. 7 is a flow diagram of a series of operations for masking repeating elements of a looping feature.

FIG. 7 is a flow diagram depicting a general implementation of a method 700 for masking repeating elements of a looping feature. Initially, in a generating operation 702, a list of elements is generated. Referring to FIGS. 2-6, these elements may be menu elements as depicted therein and correspondingly described above. However, the concepts disclosed herein may similarly be applied to elements of any looping list within a UI.

Next, in a creating operation 704, a looping feature is created from the list of elements. The looping feature generally includes repeating elements. Again, referring to FIGS. 2-6, the looping feature may be understood as the pivot menu of menu elements as depicted therein and correspondingly described above. However, the concept of a looping feature disclosed herein may similarly be applied to elements of any looping list within a UI.

Finally, in a masking operation 706, the repeating elements at an end of the looping feature are masked such that an element of a looping feature is only presented to a user once in any particular state of the UI. It may further be desirable depending upon the intended presentation format of the UI to mask repeating elements on both ends of a looping feature.

Figure 8:
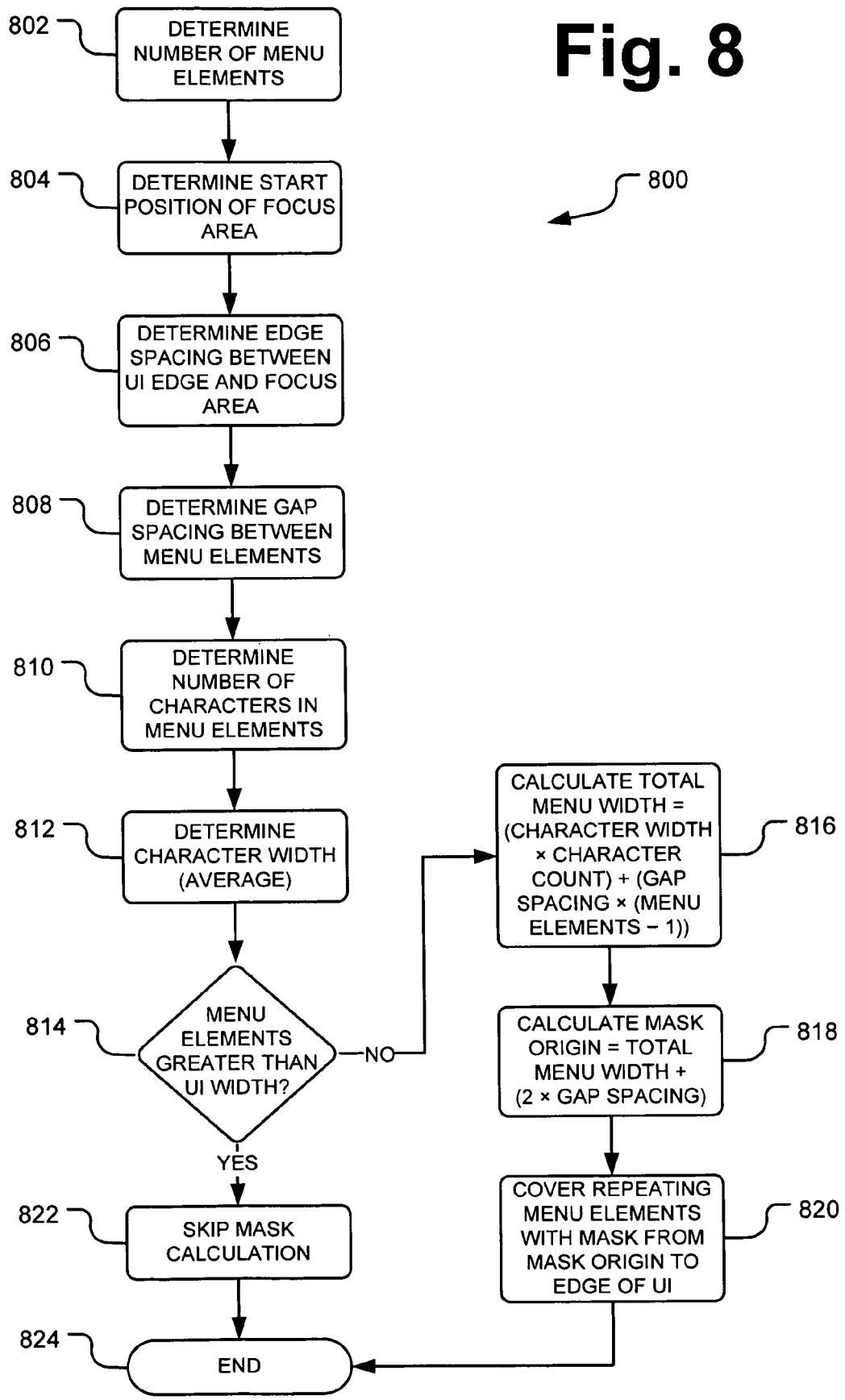
FIG. 8 is a flow diagram of a series of operations for masking repeating menu elements of a looping menu.

FIG. 8 is a flow diagram depicting a more specific implementation of a method 800 for masking repeating elements of a looping feature, in particular, repeating menu elements of a pivot menu. Initially, in a first determining operation 802, the number of menu elements in a pivot menu is determined. For example, in the case of the UI of FIGS. 3-5 there are four menu elements and in the case of FIG. 6 there are six menu elements. In a second determining operation 804, the start position (i.e., the left edge) of the focus area is determined. Recall from the examples of FIGS. 3-6 that the focus area provides a boundary for the right edge of the edge space. In a third determining operation 806, the edge space is determined as the space between a first edge of the UI, e.g., the left edge, and the start position of the focus area.

Next, in a fourth determining operation 808, the gap spacing between the menu elements is determined. As noted above, although the gap may be set as an arbitrary measure, favorable results may be achieved if the gap is determined as a function of the edge spacing. In a particular implementation, the gap spacing may be determined to be at least one-half the edge spacing previously determined. In a fifth determining operation 810, the number of characters in each of the menu elements is determined by counting. For example, in the exemplary UI of FIGS. 3-5 there are 43 characters including spaces between words in the menu elements. Further, in a sixth determining operation 812, the character width of the characters in the menu elements is determined. As described above, it may be simple and advantageous from a processing standpoint to assign an average width to the characters in the menu elements based upon font properties and weighted usage frequency of particular characters.

A query operation 814 may follow inquiring whether the menu elements are so numerous or so long in width, or a combination, that the menu elements extend across the width of the UI or screen without repeating. If not, a first calculation operation 816 may be undertaken to calculate the total menu width of the initial presentation of the menu elements on the UI. As described above, the total menu width may be defined as the following:

$$\{(\text{Average Character Width} \times \text{Character Count}) + (\text{Gap Spacing} \times (\text{Number of Menu Elements} - 1))\}.$$

Next in a second calculation operation 818, the origin or starting position for the mask may be calculated. The mask origin may be defined as follows:

$$\text{Total Menu Width} + (\text{Gap Spacing} \times 2).$$

An alternate calculation for defining the origin may be defined as the following:

$$\{\text{Total Menu Width} + \text{Edge Space}\}.$$

Once the starting position or origin of the mask is determined, a covering operation 820 may be performed. In the covering operation 820, the repeating menu elements beyond the origin of the mask are covered and obscured by the mask which extends to a second edge of the UI, e.g., the right edge. Once the mask is generated and placed and the repeating menu elements are covered, the series of operations concludes at the termination point 824.

Returning to the query operation 814, if the menu elements extend across the entire width of the UI and beyond, a skipping operation 822 may be invoked. In the skipping operation 822, the calculation of a starting position or origin for a mask is skipped. Such a calculation is unnecessary as there are no repeating menu elements on the UI at any time to mask. In this event, the series of operations concludes at the termination point 824.

Figure 9:
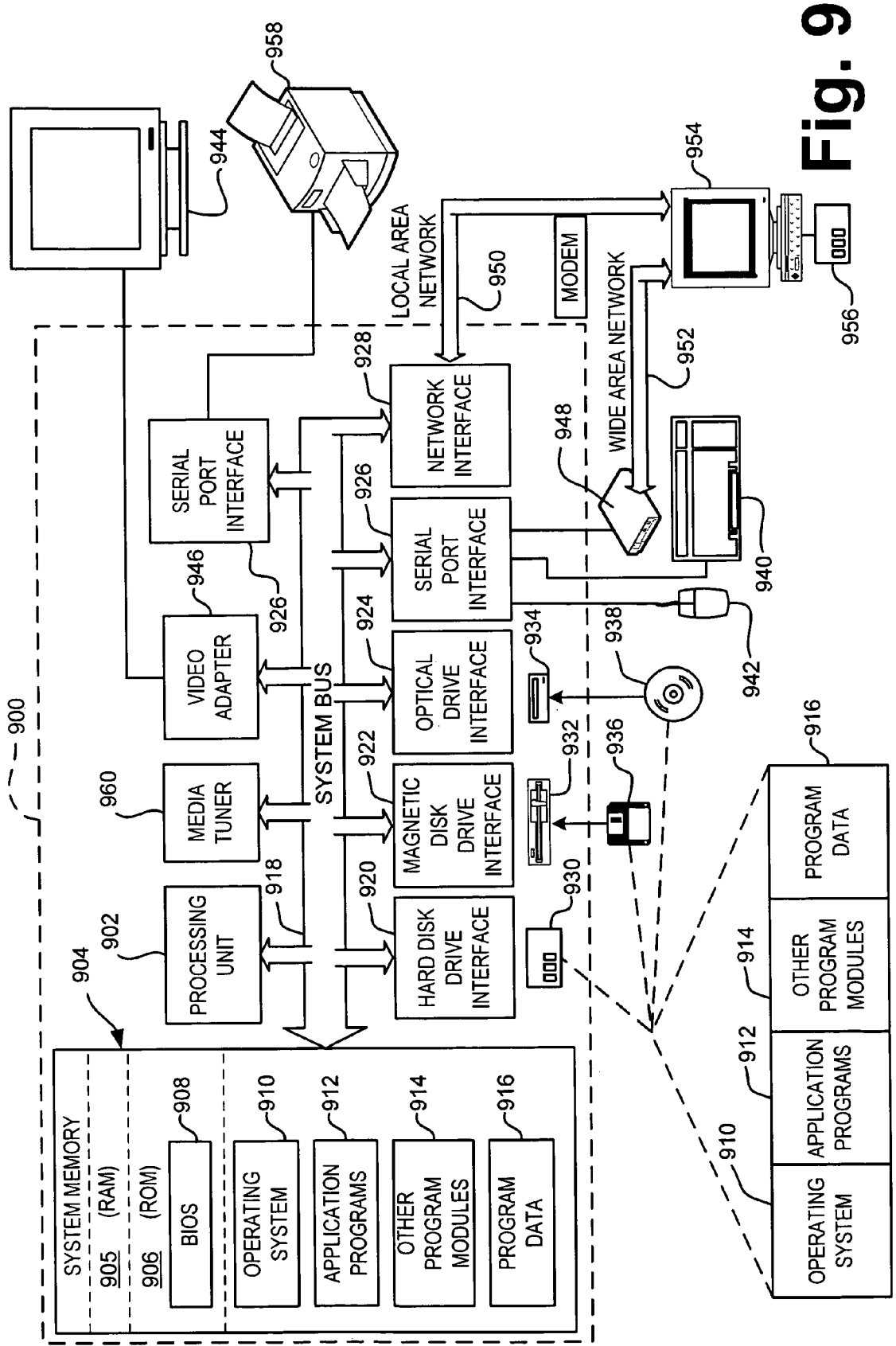
FIG. 9 is a schematic diagram of a general purpose computing system for implementing aspects of the UI in a home entertainment environment.

An exemplary hardware and operating environment of a media server or other device for implementing the invention is depicted in FIG. 9 as a general purpose computing device. A computer 900, including a processing unit 902, a system memory 904, and a system bus 918 that operatively couples various system components, including the system memory 904 to the processing unit 902 may form the basis of the media server, media receivers, or other network devices. There may be one or more processing units 902, such that the processor of computer 900 comprises a single central processing unit (CPU), or a plurality of processing units, commonly referred to as a parallel processing environment. The computer 900 may be a conventional computer, a distributed computer, or any other type of computer; the invention is not so limited.

The system bus 918 may be any of several types of bus structures including a memory bus or memory controller, a peripheral bus, a switched fabric, point-to-point connections, and a local bus using any of a variety of bus architectures. The system memory 904 may also be referred to as simply the memory, and includes read only memory (ROM) 906 and random access memory (RAM) 905. A basic input/output system (BIOS) 908, containing the basic routines that help to transfer information between elements within the computer 900, such as during start-up, is stored in ROM 906. The computer 900 further includes a hard disk drive 930 for reading from and writing to a hard disk, not shown, a magnetic disk drive 932 for reading from or writing to a removable magnetic disk 936, and an optical disk drive 934 for reading from or writing to a removable optical disk 938 such as a CD ROM or other optical media.

The hard disk drive 930, magnetic disk drive 932, and optical disk drive 934 are connected to the system bus 918 by a hard disk drive interface 920, a magnetic disk drive interface 922, and an optical disk drive interface 924, respectively. The drives and their associated computer-readable media provide nonvolatile storage of computer-readable instructions, data structures, program modules and other data for the computer 900. It should be appreciated by those skilled in the art that any type of computer-readable media that can store data that is accessible by a computer, for example, magnetic cassettes, flash memory cards, digital video disks, RAMs, and ROMs, may be used in the exemplary operating environment.

A number of program modules may be stored on the hard disk 930, magnetic disk 932, optical disk 934, ROM 906; or RAM 905, including an operating system 910, one or more application programs 912, other program modules 914, and program data 916. In an exemplary implementation, the UI, including the looping menu feature, may be incorporated as part of the operating system 910, application programs 912, or other program modules 914. State description files, object data values, and other data may also be stored as program data 916.

A user may enter commands and information into the personal computer 900 through input devices such as a keyboard 940 and pointing device 942, for example, a mouse. Other input devices (not shown) may include, for example, a microphone, a joystick, a game pad, a tablet, a touch screen device, a satellite dish, a scanner, a facsimile machine, and a video camera. These and other input devices are often connected to the processing unit 902 through a serial port interface 926 that is coupled to the system bus 918, but may be connected by other interfaces, such as a parallel port, game port, or a universal serial bus (USB).

A monitor 944 or other type of display device is also connected to the system bus 918 via an interface, such as a video adapter 946. In addition to the monitor 944, computers typically include other peripheral output devices, such as a printer 958 and speakers (not shown). These and other output devices are often connected to the processing unit 902 through the serial port interface 926 that is coupled to the system bus 918, but may be connected by other interfaces, such as a parallel port, game port, or a universal serial bus (USB). A media tuner module 960 may also be connected to the system bus 918 to tune audio and video programming (e.g., TV programming) for output through the video adapter 946 or other presentation output modules.

The computer 900 may operate in a networked environment using logical connections to one or more remote computers, such as remote computer 954. These logical connections may be achieved by a communication device coupled to or integral with the computer 900; the invention is not limited to a particular type of communications device. The remote computer 954 may be another computer, a server, a router, a network personal computer, a client, a peer device, or other common network node, and typically includes many or all of the elements described above relative to the computer 900, although only a memory storage device 956 has been illustrated in FIG. 9. The logical connections depicted in FIG. 9 include a local-area network (LAN) 950 and a wide-area network (WAN) 952. Such networking environments are commonplace in office networks, enterprise-wide computer networks, intranets and the Internet, which are all types of networks.

When used in a LAN 950 environment, e.g., the home entertainment environment, the computer 900 may be connected to the local network 950 through a network interface or adapter 928, e.g., Ethernet or other communications interfaces. When used in a WAN 952 environment, the computer 900 typically includes a modem 948, a network adapter, or any other type of communications device for establishing communications over the wide area network 952. The modem 948, which may be internal or external, is connected to the system bus 918 via the serial port interface 926. In a networked environment, program modules depicted relative to the computer 900, or portions thereof, may be stored in a remote memory storage device. The network connections shown are exemplary and other means of and communications devices for establishing a communications link between devices in the home entertainment environment incorporating computers may be used.

The technology described herein may be implemented as logical operations and/or modules in one or more systems. The logical operations may be implemented as a sequence of processor-implemented steps executing in one or more computer systems and as interconnected machine or circuit modules within one or more computer systems. Likewise, the descriptions of various component modules may be provided in terms of operations executed or effected by the modules. The resulting implementation is a matter of choice, dependent on the performance requirements of the underlying system implementing the described technology. Accordingly, the logical operations making up the embodiments of the technology described herein are referred to variously as operations, steps, objects, or modules. Furthermore, it should be understood that logical operations may be performed in any order, unless explicitly claimed otherwise or a specific order is inherently necessitated by the claim language.

The above specification, examples and data provide a complete description of the structure and use of exemplary embodiments of the invention. Although various embodiments of the invention have been described above with a certain degree of particularity, or with reference to one or more individual embodiments, those skilled in the art could make numerous alterations to the disclosed embodiments without departing from the spirit or scope of this invention. In particular, it should be understand that the described technology may be employed independent of a personal computer. Other embodiments are therefore contemplated. It is intended that all matter contained in the above description and shown in the accompanying drawings shall be interpreted as illustrative only of particular embodiments and not limiting. Changes in detail or structure may be made without departing from the basic elements of the invention as defined in the following claims.

What is claimed is:

1. A method for implementing a looping feature with repeating elements in a user interface, the method comprising generating the looping feature as a combination of primary elements and one or more repeating elements, the combination included in a menu within the user interface presented on a display device, the primary elements comprising instances of all elements included in a list, the repeating elements comprising duplicate instances of the primary elements from the list; and masking the repeating elements of the looping feature in a mask area within the menu including the combination to prevent duplicate instances of elements from being displayed on at least one end of the looping feature.

2. The method of claim 1, wherein the looping feature is oriented horizontally within the user interface.

3. The method of claim 1, wherein the looping feature is oriented vertically within the user interface.

4. The method of claim 1, wherein the menu within the user interface to display the looping feature extends across an entire dimension of the user interface.

5. The method of claim 1, further comprising masking repeating elements of the looping feature on both a first end and a second end of the looping feature.

6. A computer-readable storage medium having computer-executable instructions performing a computer process implementing the method of claim 1.

7. A method for implementing a menu in a user interface, the method comprising
- generating a list of menu elements for display in the menu within the user interface presented on a display device;
- generating a looped display of the menu elements comprising a combination of instances of all the menu elements included in the list and one or more duplicate instances of menu elements from the list; and
- generating a mask to obscure an area within the menu including the combination to prevent the one or more duplicate instances of the menu elements from being displayed on at least one end of the looped display.

8. The method of claim 7, wherein the looped display is oriented horizontally within the user interface.

9. The method of claim 7, wherein the looped display is oriented vertically within the user interface.

10. The method of claim 7, wherein the menu within the user interface to display the looped display extends across an entire dimension of the user interface.

11. The method of claim 7, wherein the mask prevents the one or more duplicate instances of the menu elements from being displayed on both a first end and a second end of the looped display.

12. The method of claim 7, wherein the mask obscures the one or more duplicate instances of the menu elements without obscuring other elements of the user interface.

13. A computer-readable storage medium having computer-executable instructions performing a computer process implementing the method of claim 7.

14. A method for implementing a menu in a user interface comprising
- generating a list of menu elements for display in the menu within the user interface presented on a display device;
- generating a looped display of the menu elements comprising a combination of instances of all the menu elements included in the list and one or more duplicate instances of the menu elements from the list;
- calculating a total menu dimension of the list of menu elements;
- determining an edge space distance between a focus area in the user interface and a first edge of the user interface;
- determining a gap spacing between the menu elements in the list of menu elements;
- calculating an origin for a mask as a function of the total menu dimension, the edge space distance, and the gap spacing;
- generating a mask to obscure an area within the menu including the combination to prevent the one or more duplicate instances of the menu items from being displayed on at least one end of the looped display; and
- positioning the mask to extend from the origin toward a second edge of the user interface.

15. The method of claim 14, wherein the menu elements further comprise components and the operation of calculating a total menu dimension further comprises
- determining a number of the components comprising the menu elements;
- determining an average dimension of the components;
- calculating a first product of the number of components and the average dimension;
- determining a number of the menu elements in the list of menu elements;
- calculating a second product of the gap spacing and a difference of the number of menu elements less one; and
- calculating a sum of the first product and the second product.

16. The method of claim 15, wherein the operation of calculating the origin further comprises
- calculating a third product of twice the gap spacing; and
- calculating a sum of the first product, the second product, and the third product.

17. The method of claim 14, wherein the operation of determining the gap spacing further comprises calculating the gap spacing as a function of the edge space distance.

18. The method of claim 14 further comprising doubling the gap spacing between a first menu element and a last menu element among the list of menu elements.

19. The method of claim 14, wherein the looped display is oriented horizontally within the user interface.

20. A computer-readable storage medium having computer-executable instructions performing a computer process implementing the method of claim 14.

* * * * *